(No Model.) 2 Sheets—Sheet 1.

W. E. LEIDIGER.
INSECT DESTROYER.

No. 541,556. Patented June 25, 1895.

Witnesses
Jas. K. McCathran

Inventor
William E. Leidiger
By his Attorneys:
C. A. Snow & Co.

(No Model.) 2 Sheets—Sheet 2.
W. E. LEIDIGER.
INSECT DESTROYER.
No. 541,556. Patented June 25, 1895.
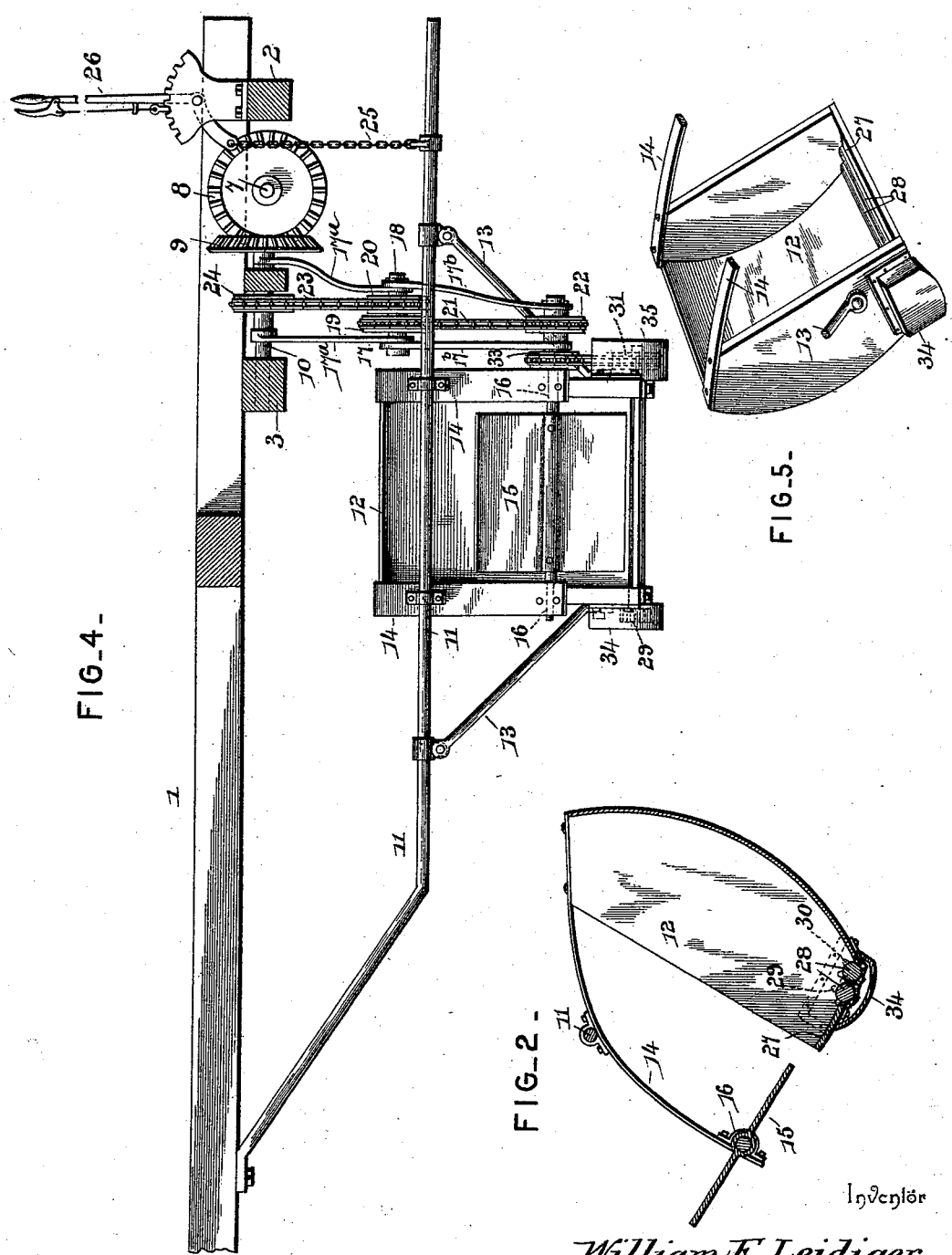

UNITED STATES PATENT OFFICE.

WILLIAM E. LEIDIGER, OF FALL CREEK, WISCONSIN.

INSECT-DESTROYER.

SPECIFICATION forming part of Letters Patent No. 541,556, dated June 25, 1895.

Application filed April 5, 1895. Serial No. 544,666. (No model.)

*To all whom it may concern:*

Be it known that I, WILLIAM E. LEIDIGER, a citizen of the United States, residing at Fall Creek, in the county of Eau Claire and State of Wisconsin, have invented a new and useful Plow Attachment, of which the following is a specification.

My invention relates to an attachment for sulky plows or cultivators, and particularly to an insect exterminator designed for use in the cultivation of potatoes to remove the potato-bugs from the vines.

Various changes and advantages of the invention will appear in the following description and the novel features thereof will be particularly pointed out in the appended claims.

Figure 1:
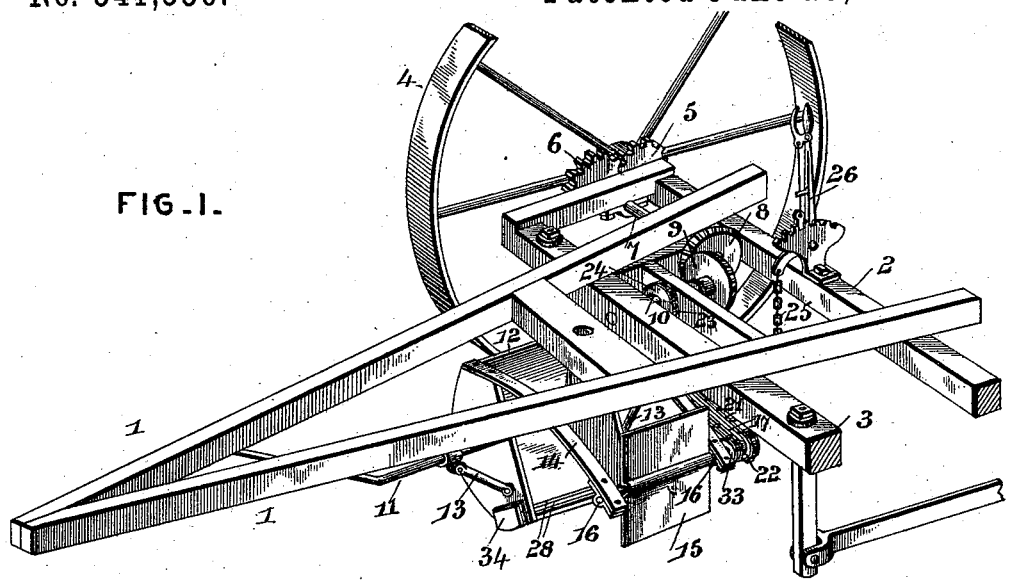
Figure 3:
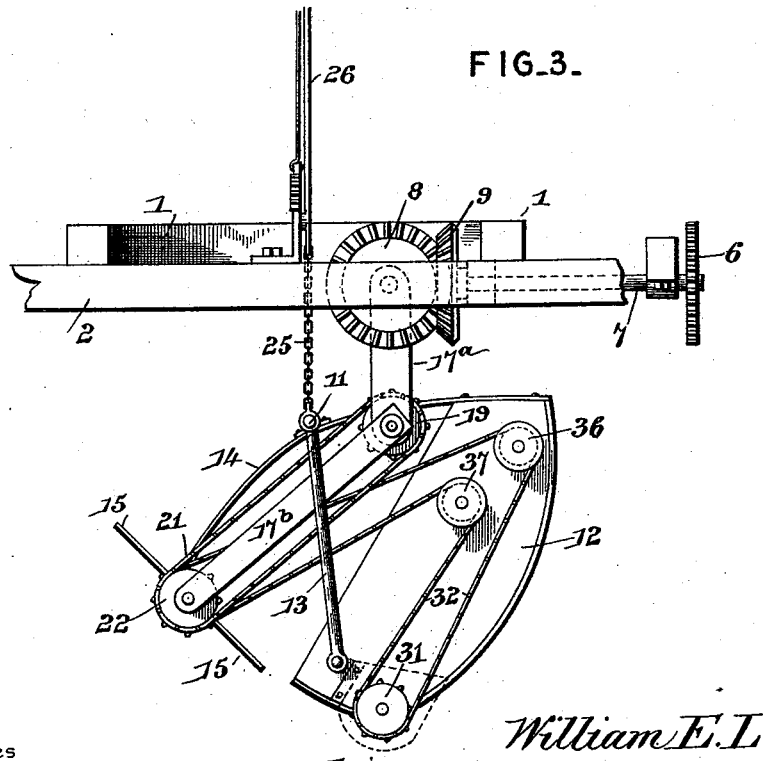

In the drawings, Figure 1 is a perspective view of the device constructed in accordance with my invention applied in the operative position to a portion of a sulky-plow. Fig. 2 is a transverse vertical section through the receptacle and the beater or reel. Fig. 3 is a rear view of the attachment. Fig. 4 is a side view of the same. Fig. 5 is a detail view, in perspective, of the receptacle.

Similar numerals of reference indicate corresponding parts in all the figures of the drawings.

1 designates the frame of a cultivator having a transverse axle 2 and a shovel-carrying beam 3, the wheel 4 mounted on one end of the axle having a gear 5 which meshes with a gear 6 carried by a shaft 7 which is parallel with the axle. This constitutes the main shaft of the apparatus, and it communicates motion by means of intermeshing gears 8 and 9 with a countershaft 10 mounted in suitable bearings on the frame parallel with the direction of movement of the cultivator.

Loosely connected at its front end to the frame and extending longitudinally toward the rear of the same to a point adjacent to the axle is a supporting rod 11 upon which is suspended a receptacle 12 for the potato-bugs, front and rear braces 13 being extended from the sides of this receptacle to the supporting rod and spring side bars 14 being secured at one end to the receptacle and at intermediate points to the supporting rod and projecting beyond the same to carry the beater or reel 15. The spindle of this beater or reel is mounted in bearings 16 at the extremities of the spring side bars and extends at one end beyond the contiguous side bar where it is mounted in bearings in the outer extremities of jointed supporting arms 17 comprising pivotally connected members $17^a$ and $17^b$. The joint between the members of these arms 17 is secured by means of a spindle 18 carrying chain wheels or gears 19 and 20. The chain wheel or gear 19 is connected by means of a chain 21 with a similar chain wheel or gear 22 on the extremity of the spindle of the beater or reel, and the chain wheel 20 is connected by means of a chain 23 with a chain wheel 24 on the countershaft 10.

The upper members $17^a$ of the jointed supporting arms are fulcrumed upon the countershaft 10, and hence it will be seen that the receptacle may be vibrated laterally and vertically to bring it in the proper position with relation to a row of plants without affecting the connections whereby motion is communicated from the driving mechanism to the beater or reel. The rear end of the supporting rod 11 is connected by means of a chain 25 to a hand lever 26 fulcrumed upon the frame of the cultivator and having means for securing it at the desired adjustment.

Mounted in bearings at the lower end of the receptacle 12 which is provided with an inwardly concaved wall 27 are the crushing rollers 28 connected together at one end by intermeshing gears 29 and 30, whereby they are caused to rotate in opposite directions. One of the rollers is provided with a terminal chain gear 31 which is connected by means of a chain 32 with a chain wheel or gear 33 on the spindle of the beater or reel, and guards 34 and 35 are arranged upon the lower portion of the receptacle to cover said gears and thereby prevent clogging by contact with the plants or the soil.

In order to provide for the yielding of the beater or reel by reason of the flexibility of the spring side bars the chain 32, instead of extending directly from the gear 31 and the gear 33, passes around idlers 36 and 37 mounted upon the side of the receptacle, as shown clearly in Fig. 3.

The means above described provide for the adjustment of the receptacle to occupy a position upon one side of a row of plants, while the beater or reel is arranged in a position to strike the opposite side of the plants and thus vibrate the same toward the receptacle, and by reason of the spring side bars upon which the beater is mounted the latter is adapted to yield to avoid injuring the plants.

Variations in the line of the row of plants or in the movement of the machine may be compensated for by lateral movement of the receptacle and beater, the same being possible by reason of the loosely suspended supporting rod 11. The loose suspension of the rod 11 is attained in the construction illustrated in the drawings by bolting the front end thereof to the frame and connecting the rear end thereof by means of a chain 25 to the hand-lever 26. The bolt being in a vertical plane provides for lateral swinging movement of the rear end of the rod to allow the receptacle to follow the row of plants, and in practice the bolt is made sufficiently loose to allow vertical movement of the rod, whereby adjustment of the receptacle in a vertical plane may be attained. It is obvious that a comparatively slight looseness of the bolt in the opening at the front end of the rod 11 will allow sufficient vertical movement of the receptacle for the reason that the movement of said rod at the point of connection to the frame is small compared with the amount of movement of the receptacle. In order that but slight looseness may be necessary at said point of connection, the rod 11 is purposely made of considerable length with the receptacle arranged in rear of the center thereof.

Various changes in the form, proportion, and the minor details of construction may be resorted to without departing from the spirit or sacrificing any of the advantages of this invention.

Having described my invention, what I claim is—

1. In a machine of the class described, the combination with a loosely suspended receptacle, of a spring supported beater or reel arranged in operative relation therewith, and connections for imparting rotary motion to the beater or reel, substantially as specified.

2. In a machine of the class described, the combination of a loosely suspended receptacle, spring side bars, a beater or reel mounted upon said side bars, and flexible connections for imparting motion to the beater or reel, substantially as specified.

3. In a machine of the class described, the combination of a loosely suspended receptacle, a beater or reel mounted in operative relation therewith, a countershaft connected with operating mechanism, jointed arms connecting the countershaft with the spindle of the beater or reel, and flexible connections for communicating motion from the countershaft to the spindle of the beater or reel, substantially as specified.

4. In a machine of the class described, the combination of a loosely suspended receptacle, a beater or reel mounted in operative relation therewith, a countershaft connected with operating mechanism, jointed arms connecting the countershaft with the spindle of the beater or reel, an intermediate spindle forming the joint between the members of said arms, chain wheels or gears carried by the countershaft and said spindles, and chains connecting the wheels or gears for communicating motion from the countershaft to the spindle of the beater or reel, substantially as specified.

5. In a machine of the class described, the combination of a loosely mounted supporting rod, and means for adjusting the same, a receptacle suspended from said rod, a beater or reel mounted in operative relation with the receptacle, and means for imparting rotary motion to the beater or reel, substantially as specified.

6. In a machine of the class described, the combination of a movable supporting rod, means for adjusting the same, a receptacle suspended from said rod, spring side bars carried by the receptacle, a beater or reel mounted in bearings at the free ends of the side bars, a countershaft connecting with operating mechanism, jointed arms connecting the countershaft with the spindle of the beater or reel and supporting an intermediate spindle, flexible connections between the countershaft and the spindle of the beater or reel, contiguous crushing rollers mounted at the outlet end of the receptacle and geared together for simultaneous rotation in opposite directions, a chain connection between the spindle of the beater or reel and one of said rollers, and idle pulleys mounted upon the side of the receptacle for guiding the intermediate portions of said chain, whereby the relative movement of the beater or reel by reason of the flexibility of the side bars does not affect the communication of motion from the beater or reel to the crushing rollers, substantially as specified.

In testimony that I claim the foregoing as my own I have hereto affixed my signature in the presence of two witnesses.

WILLIAM E. LEIDIGER.

Witnesses:
J. E. ZETZMAN,
FRED KNUMANN.